United States Patent [19]

Gembicki et al.

[11] 4,039,479

[45] Aug. 2, 1977

[54] METHOD OF CATALYST MANUFACTURE

[75] Inventors: Stanley A. Gembicki, Western Springs; Richard W. Arbesman, Wheeling, both of Ill.

[73] Assignee: UOP Inc., Des Plaines, Ill.

[21] Appl. No.: 722,933

[22] Filed: Sept. 10, 1976

[51] Int. Cl.$^2$ ............................................. B01J 29/06
[52] U.S. Cl. ................................................ 252/455 Z
[58] Field of Search ................................... 252/455 Z

[56] References Cited

U.S. PATENT DOCUMENTS 3,542,670 11/1970 Erickson et al. ............... 252/455 Z
3,562,345 2/1971 Mitsche ........................... 252/455 Z
3,965,042 6/1976 Feldwick et al. ................ 252/455 R Primary Examiner—Carl F. Dees
Attorney, Agent, or Firm—James R. Hoatson, Jr.; Robert W. Welch; William H. Page, II

[57] ABSTRACT

A method of manufacture providing a catalytic composite of improved activity is disclosed. A zeolite of the mordenite crystal structure, with a sodium content of less than about 5 wt. % as $Na_2O$, is subjected to an aqueous ammoniacal treatment at a pH of at least about 9.5, and calcined in intimate admixture with a non-zeolitic refractory inorganic oxide and a metal salt convertible to said oxide at calcination conditions.

12 Claims, No Drawings

METHOD OF CATALYST MANUFACTURE

Crystalline aluminosilicates, or zeolites, of which mordenite is one example, are well known in the art and have found extensive application as hydrocarbon conversion catalysts, or as a component thereof. Such materials are of ordered crystalline structure often visualized as a three-dimensional network of fundamental structural units consisting of silicon-centered $SiO_4$, and aluminum-centered $AlO_4$ tetrahedra. The tetrahedra are interconnected by a mutual sharing of apical oxygen atoms, and arranged to form cages or cavities in open communication through smaller intracrystalline channels or pore openings whose narrowest cross-section has essentially a uniform diameter characteristic of each crystalline aluminosilicate variety. To effect a chemical balance, each $AlO_4$ tetrahedra has a cation associated therewith — usually a sodium or other exchangeable cation. The aforementioned cages or cavities are occupied by water molecules and by the last-mentioned cations, both of which exhibit considerable freedom of movement permitting ion-exchange and reversible dehydration.

The crystalline aluminosilicates, or zeolites, employed in the manufacture of the catalytic composite of this invention, are of the mordenite crystal structure, highly siliceous in nature and generally characterized by a silica-alumina mole ratio of from about 6 to about 12 as found in nature. The mordenite crystal structure comprises four-and five-membered rings of the $SiO_4$ and $AlO_4$ tetrahedra so arranged that the crystal latice comprises pores and channels running parallel along the crystal axis to give a tubular configuration. This structure is unique among the crystalline aluminosilicates since the channels or tubes do not intersect, and access to the cages or cavities is in only one direction. For this reason, the mordenite structure is frequently referred to as two-dimensional. This is in contrast to other well-known crystalline aluminosilicates, for example faujasite, in which the cavities can be entered from three directions. Mordenite clinoptilolite, or mordenite which has been synthesized or acid extracted, caustic extracted, or otherwise treated to increase the silica-alumina mole ratio to about 20:1 or more while maintaining the mordenite crystal structure, may be used in the manufacture of the catalytic composite of this invention.

Crystalline aluminosilicates having a mordenite crystal structure have heretofore been utilized composited with a non-zeolitic refractory inorganic oxide, typically alumina, as a hydrocarbon conversion catalyst, and are particularly useful with respect to the transalkylation of alkylaromatic hydrocarbons. It is an object of this invention to present a new and useful method of manufacture providing a catalytic composite of improved activity.

In one of its broad aspects, the present invention embodies a method of manufacture which comprises subjecting a zeolite of the mordenite crystal structure, and containing less than about 5 wt. % sodium as $Na_2O$, to an aqueous ammoniacal treatment at a pH of at least about 9.5, and calcining the thus treated zeolite in intimate admixture with a non-zeolitic refractory inorganic oxide or gel and a metal salt convertible to said oxide at calcination conditions, said salt being in sufficient concentration to provide from about 5 to about 20 wt. % of the non-zeolitic refractory inorganic oxide content of said catalytic composite.

One of the more specific embodiments relates to a method of manufacture providing a catalytic composite of improved activity which comprises subjecting a zeolite of the mordenite crystal structure, containing less than about 5 wt. % sodium as $Na_2O$, to an aqueous ammoniacal treatment at a pH of from about 10 to about 12, and calcining the thus treated zeolite in intimate admixture with an alumina and an aluminum salt of a strong acid convertible to said alumina at calcination conditions, said salt being in sufficient concentration to provide from about 5 to about 20 wt. % of the non-zeolitic alumina content of said catalytic composite.

A still more specific embodiment is in a method of manufacture which comprises subjecting mordenite containing less than about 5 wt. % sodium as $Na_2O$, to an aqueous ammoniacal treatment at a pH of from about 10 to about 12 and a temperature of from about 75° to about 200° C., and calcining the thus treated zeolite in intimate admixture with an alpha-alumina monohydrate and aluminum nitrate at a temperature of from about 475° to about 550° C., said alumina nitrate being in sufficient concentration to provide from about 5 to about 20 wt. % of the non-zeolitic alumina content of said catalytic composite.

Other objects and embodiments of this invention will become apparent in the following detailed specification.

Pursuant to the method of the present invention, a zeolite of the mordenite crystal structure containing less than about 5 wt. % sodium as $Na_2O$, is subjected to an aqueous ammoniacal treatment of a pH of at least about 9.5, and said treatment can be prior to or subsequent to admixture with a hereinafter described metal salt and non-zeolitic refractory inorganic oxide, the latter being preferred. The aqueous ammoniacal treatment is suitably effected over a period of from about 1 to about 24 hours by maintaining the zeolite in contact with the ammoniacal solution at a temperature of from about 50° to about 200° C. The treatment is advantageously carried out in a closed vessel over a period of from about 1 to about 10 hours at an elevated pressure generated during the course of the treatment. However, the treatment may be effected in an open vessel at atmospheric pressure conditions albeit over a more extended period up to about 24 hours. In the latter case, it is preferable to effect the treatment at about the reflux temperature of the aqueous ammoniacal solution.

The aqueous ammoniacal solution employed herein is preferably an aqueous ammonium hydroxide solution, the ammonium hydroxide being in sufficient concentration to provide a pH of at least about 9.5, and preferably from about 10 to about 12. Bases other than ammonium hydroxide which may be utilized include hydroxylamine, hydrazine, tetramethylammonium hydroxide, etc., or the strong organic amines like methylamine, dimethylamine, ethylamine, diethylamine, propylamine, diisopropylamine, n-butylamine, t-butylamine, diisobutylamine, n-amylamine, n-hexylamine, ethylenediamine, hexamethylenediamine, benzylamine, analine, piperazine, piperadine, and the like.

The crystalline aluminosilicate, or zeolite, employed herein as a starting material should contain, or should be treated to contain, less than about 5 wt. % sodium as $Na_2O$. The sodium can be reduced to an acceptable level by conventional and widely practiced ion-exchange techniques. Typically, ammonium cations are exchanged for sodium cations on treating the zeolite in contact with an ammonium salt solution, for example an aqueous chloride solution. The resulting ammonium-exchanged zeolite is thereafter heat-treated to effect thermal decomposition of the ammonium cations and formation of the hydrogen form of the zeolite. The treatment may be carried out one or more times to reduce the sodium content of the zeolite to less than about 5 wt. % as $Na_2O$.

Refractory inorganic oxides for use in accordance with the method of this invention include the naturally occurring as well as the synthetically prepared non-zeolitic refractory inorganic oxides. Suitable refractory inorganic oxides are such as alumina, silica, zirconia, titania, thoria, boria, magnesia, chromia, stannic oxide, and the like as well as combinations and composites thereof, for example alumina-silica, alumina-zirconia, alumina-titania, etc. Alumina is a preferred refractory inorganic oxide for use herein, particularly with respect to the manufacture of a catalytic composite for use in the transalkylation of alkylaromatic hydrocarbons. The alumina may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like, the first mentioned alpha-alumina monohydrate being preferred.

The metal salts employed in the practice of this invention are those metal salts which are convertible to the refractory inorganic oxide employed at calcination conditions. The inclusion of said salt in admixture with the zeolite and refractory inorganic oxide has been found to effect a significant improvement in the activity of the catalytic composite produced therefrom, particularly with respect to the transalkylation of alkylaromatic hydrocarbons. Any metal salt which is oxidizable and/or decomposable to the selected refractory inorganic oxide at calcination conditions can be utilized. Suitable metal salts particularly include the metal salts of strong acids, especially aluminum nitrate, aluminum sulfate, aluminum chloride, and the like, but also the nitrates, sulfates, halides, etc., of silicon, zirconium, titanium, thorium, boron, magnesium, chromium, tin, and the like. In any case, the salt concentration should be sufficient to provide from about 5 to about 20 wt. % of the non-zeolitic refractory inorganic oxide content of the final catalytic composite product.

The selected metal salt, refractory inorganic oxide and zeolite may be combined in intimate admixture in any conventional or otherwise convenient manner to form spheres, pills, pellets, granules, extrudates, or other suitable particle shape. For example, finely divided zeolite and metal salt particles can be dispersed in an alumina sol, and the mixture in turn dispersed as droplets in a hot oil bath whereby gelation occurs with the formation of spheroidal gel particles. An alumina sol such as results from the digestion of aluminum in hydrochloric acid under controlled conditions is a particularly useful sol in this type of operation. In this type of operation, the alumina is set chemically utilizing ammonia as the neutralizing or setting agent, typically at a pH in the 4.5–5.5 range, the ammonia being furnished by an ammonia precursor, such as hexamethylenetetramine, included in the sol. The method is described in greater detail in U.S. Pat. No. 2,620,314.

A more preferred method comprises commingling a finely divided form of the selected zeolite, refractory inorganic oxide and the metal salt with a binder and/or lubricant and compressing the mixture into pills or pellets of uniform size and shape as is the common practice. Alternatively, and still more preferably, the zeolite, refractory inorganic oxide and metal salt are combined and admixed with a peptizing aget in a mix-muller, a dilute nitric acid being one example of the suitable peptizing agent. The resulting dough can be pressured through a die or orifice of predetermined size to form extrudate particles which can be dried and calcined and utilized as such, or formed into spheres by means of a spinning disc or drum and then dried and calcined. Spheroidal particles are also suitably prepared by the method whereby the finely divided zeolite, refractory inorganic oxide and metal salt particles are dry-mixed and discharged into contact with a peptizing agent on a rotating inclined pan or disc to effect agglomerative spheroidizing of said particles, the resulting spheres being subsequently dried and calcined. In any case, the zeolite can be subjected to the aqueous ammoniacal treatment herein contemplated either before or subsequent to admixture with the refractory inorganic oxide and metal salt. The zeolite is preferably calcined in intimate admixture with the selected refractory inorganic oxide and metal salt in a ratio to provide a final composite comprising said zeolite and refractory inorganic oxide in a weight ratio of from about 1:3 to about 3:1.

Regardless of whether the zeolite is subjected to the aqueous ammoniacal treatment before or after admixture with the refractory inorganic oxide and metal salt, the treated zeolite is calcined in intimate admixture therewith to form a catalytic composite. The calcination is suitably in an air atmosphere at a temperature of from about 425° to about 750° C., preferably at a temperature of from about 475° to about 550° C., over a period of from about 0.5 to about 10 hours.

The catalytic composite of this invention is particularly useful for the transalkylation of alkylaromatic hydrocarbons. Thus, an alkyl-aromatic hydrocarbon having from about 7 to about 15 carbon atoms per molecule is treated at transalkylation reaction conditions, including a temperature of from about 200° to about 480° C. and a pressure of from about atmospheric to about 1500 psig, in contact with a catalyst comprising essentially the catalytic composite of this invention to form products of higher and lower number of carbon atoms than said alkylaromatic hydrocarbon. The preferred composition employed as the catalytic composite comprises mordenite in admixture with alumina, said mordenite comprising from about 25 to about 75 wt. % of said composite.

The alkylaromatic hydrocarbon feed stock can be a substantially pure alkylaromatic hydrocarbon of from about 7 to about 15 carbon atoms, a mixture of such alkylaromatic hydrocarbons, or a hydrocarbon fraction rich in said alkylaromatics. Suitable alkylaromatic hydrocarbons include alkylbenzenes and alkylnaphthalenes, preferably with an alkyl group of less than about 4 carbon atoms. The catalytic composite is particularly effective in the treatment of the more difficulty transalkylatable toluene to form benzene, xylenes, or other polymethylbenzenes.

The transalkylation, or disproportionation, reaction can be effected in contact with the catalytic composite of this invention in any conventional or otherwise convenient manner and may comprise a batch or continuous type of operation. A preferred operation is a continuous type or operation. For example, the above-described catalyst is disposed as a fixed bed in a reaction zone of a vertical tubular reactor, and the alkylaromatic feed stock charged through the bed in an upflow or downflow manner, the reaction zone being maintained at a temperature of from about 200° to about 480° C., preferably at a temperature of from about 220° to about 460° C. Although pressure does not appear to be an important variable with respect to the transalkylation reaction of this invention, the process is generally conducted in the presence of an imposed hydrocarbon pressure to provide from about 1 to about 10 moles of hydrogen per mole of hydrocarbon. However, there is no net consumption of hydrogen in the process, and the hydrogen charnge is recovered from the reactor effluent and recycled.

The transalkylation reaction can be effected over a wide range of space velocities. In general, the process is conducted at a space velocity of from about 0.2 to about 10. Space velocities herein referred to are liquid hourly space velocities (LHSV) i.e., volume of charge per volume of catalyst per hour. While the catalytic composite prepared by the present method permits unusually high space velocities indicative of high activity, the catalytic composite is particularly noteworthy because of its relatively high stability at a high activity level.

The composite prepared in accordance with the method of this invention may be employed as a component of a catalyst comprising any of the several catalytically active metallic materials in the oxidized or reduced state. Of particular interest are those catalytic composites comprising one or more metals of Group VIB and VIII including molybdenum, tungsten, chromium, iron, nickel, cobalt, platinum, palladium, ruthenium, rhodium, osmium and iridium. Thus, the composite of this invention can be utilized advantageously as a catalyst or component thereof to effect a variety of hydrocarbon conversion reactions involving reaction conditions comprising a temperature in the 25°–760° C. range. The catalysts are particularly useful in effecting the hydrocracking of heavy oils, including vacuum residuals, to form petroleum products in the middle distillate range utilizing a temperature of from about 260° to about 156° C. and pressures of from about 500 to about 1000 psig. Said hydrocarbon conversion reactions further include polymerization of olefins, particularly ethylene, propylene, 1-butene, 2-butene, isobutylene and also higher boiling olefins, at polymerization reaction conditions. The composite of this invention is also useful as a catalyst or component thereof in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins including nonenes, decenes, undecenes, etc., the foregoing alkylation reactions being effected at alkylation conditions disclosed in the art. The composite of this invention is further useful in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,2- and 2,3-dimethylbutane, isomerization of naphthenes, for example, the isomerization of dimethylcyclopentane to methylcyclohexane, isomerization of methylcyclopentane to cyclohexane, etc., at isomerization reaction conditions. Other hydrocarbon conversion reactions including the reforming of naphtha to gasoline, dehydrogenation of ethylbenzene to styrene, and hydrogenation of benzene to cyclohexane, are effectively catalyzed utilizing the composite of this invention as a catalyst or as a component thereof.

The following examples are presented in illustration of the method of this invention and are not intended as an undue limitation on the generally broad scope of the invention as set out in the appended claims.

EXAMPLE I

A catalytic composite of mordenite and alumina was prepared in accordance with one preferred embodiment of this invention. Thus, about 510 grams of aluminum nitrate nonahydrate and 20 milliliters of a concentrated nitric acid peptizing agent diluted to 400 milliliters of water, were admixed with approximately 695 grams of an alpha-alumina monohydrate (Kaiser Medium) and 595 grams of a hydrogen mordenite (H-Zeolon) containing 0.16 wt. % sodium as $Na_2O$. The alumina further contained about 28 wt. % volatile matter as evidence by weight loss on ignition at 900° C., and the mordenite contained about 16 wt. %. The mixture was treated in a mix-muller to form an extrudable dough, and the dough was extruded through a 1/16 inch die. The extrudate was segmented into lengths of about $\frac{1}{8}$–$\frac{1}{4}$ inch and calcined in air for about 1 hour at 500° C. The calcined particles were then immersed in an aqueous ammoniacal solution containing 15 wt. % ammonia and having a pH of about 11.6. 1.5 Volumes of solution were employed per volume of particles treated. The treatment in this instance was at substantially atmospheric pressure conditions utilizing a glass flask vented to the atmosphere through an overhead condenser. The treatment was effected over a 15 hour period at about reflux temperature, that is, at about 90° C. The extrudate particles were then water-washed, dried for 1 hour at 150° C., and then calcined in air for 2 hours at 48° C. The resulting catalytic composite is hereinafter referred to as Catalyst A.

EXAMPLE II

In this example, a catalytic composite of mordenite and alumina was prepared in accordance with the method of Example I except that the aqueous ammoniacal treatment was at an elevated pressure. In this instance, the calcined extrudate particles were sealed in a glass-lined autoclave together with the aqueous ammoniacal solution. The solution in this case was employed two volumes per volume of particles treated. The autoclave was heated to 110° C., and the extrudate particles were treated at this temperature under autogenous pressure conditions for 2 hours. The particles thus treated were recovered, water-washed and dried, and calcined in air for 1 hour at 500° C. The catalytic composite of this example is hereinafter referred to as Catalyst B.

EXAMPLE III

A catalytic composite of mordenite and alumina was prepared substantially as described in Example 595 except that the metal salt, i.e., aluminum nitrate, was omitted from the formulation. In this example, 694 grams of the alpha-alumina monohydrate was initially dry-mixed with 595grams of the mordenite and the mixture was mulled with 20 milliliters of the concentrated nitric acid peptizing agent diluted to 400 milliliters with water. The resulting dough was extruded, ad the extrudate segmented to form extrudate particles.

The extrudate particles were dried and calcined, and subjected to an aqueous ammoniacal treatment, all in accordance with the method of Example I. The extrudate particles were subjected to a final calcination in air for 1 hour at 150° C., and for 2 hours at 480° C. The catalytic composite of this example is hereinafter referred to as Catalyst C.

EXAMPLE IV

In this example, a catalytic composite of mordenite and alumina was prepared as described in Example III, except that the aqueous ammoniacal treatment was at an elevated pressure substantially as described in Example II. The resulting catalytic composite is hereinafter referred to as Catalyst D.

The above-described preparations were evaluated with respect to the transalkylation of toluene. In each case, toluene, in admixture with hydrogen to provide a hydrogen/hydrocarbon mole ratio of about 8, was charged downflow through a 50 cubic centimeter bed of approximately 1/16 inch extrudate catalyst particles at a liquid hourly space velocity of 1.0, and at transalkylation conditions including a pressure of 500 psig. The temperature of the catalyst bed was adjusted to effect a 40% conversion of a toluene feed stock, the temperature in each case being taken as a measure of catalyst activity.

TABLE I

| Catalyst | A | B | C | D |
|---|---|---|---|---|
| Particle Density*, gms/cc | 1.509 | 1.509 | 1.263 | 1.263 |
| Bulk Density*, gms/cc | 0.67 | 0.67 | 0.67 | 0.61 |
| Temp., 40% Conversion, ° F. | 698 | 675 | 727 | 723 |

*Average

It is apparent with reference to the foregoing examples that Catalyst A and Catalyst C, each having been treated with an aqueous ammoniacal solution at atmospheric pressure conditions, are substantially the same except that approximately 10 wt. % of the alumina content of Catalyst A was derived from aluminum nitrate included in the formulation thereof pursuant to the present invention, and yet Catalyst A is 29° more active than Catalyst C. This can only be attributed to the inclusion of the metal salt in the catalyst formulation.

The inclusion of the metal salt in the catalyst formulation effects an even greater activity improvement when, pursuant to one preferred embodiment of this invention, the aqueous ammoniacal treatment is at a relatively high pressure. This is apparent with reference to Catalyst B and Catalyst D, said catalysts being substantially the same exdept that about 10 wt. % of the alumina content of Catalyst B was driven from aluminum nitrate included in the formulation thereof, both catalysts having been treated with the aqueous ammoniacal solution at the same relatively high pressure conditions. The 48° increase in activity exhibited by Catalyst B with respect to Catalyst D is considerably greater than the improvement exhibited by Catalyst A over Catalyst C.

The practice of the present invention therefore results, not only in a catalyst of improved activity, but in a catalyst which is more susceptible and responsive to the relatively high pressure aqueous ammonia treatment.

We claim as our invention:

1. A method of preparing a catalytic composite which comprises subjecting a zeolite of the mordenite crystal structure and containing less than about 5 wt. % sodium as $Na_2O$, to an aqueous ammoniacal treatment at a pH of at least about 9.5, and calcining the thus treated zeolite in intimate admixture with a refractory inorganic oxide or gel and a metal salt convertible to said oxide at calcination conditions, said salt being in sufficient concentration to provide from about 5 to about 20 wt. % of the refractory inorganic oxide content of said catalytic composite.

2. The method of claim 1 further characterized in that said zeolite is mordenite.

3. The method of claim 1 further characterized in that said zeolite is clinoptilolite.

4. The method of claim 1 further characterized in that said refractory inorganic oxide is an alumina and said metal salt is an aluminum salt of a strong acid.

5. The method of claim 1 further characterized in that said refractory inorganic oxide is an alpha-alumina monohydrate.

6. The method of claim 1 further characterized in that said zeolite is calcined in intimate admixture with said refractory inorganic oxide and said metal salt to provide a catalytic composite comprising said zeolite and a refractory inorganic oxide in a weight ratio of from about 1:3 to about 3:1.

7. The method of claim 1 further characterized in that said refractory inorganic oxide is an alumina and said metal salt is aluminum nitrate.

8. The method of claim 1 further characterized in that said zeolite is calcined in intimate admixture with said refractory inorganic oxide and said metal salt at a temperature of from about 425° to about 750° C.

9. The method of claim 1 further characterized in that said zeolite is calcined in intimate admixture with said refractory inorganic oxide and said metal salt at a temperature of from about 425° to about 550° C.

10. The method of claim 1 further characterized in that said aqueous ammonia treatment is effected at a pH of from about 10 to about 12.

11. The method of claim 1 further characterized in that said aqueous ammoniacal treatment is effected at a temperature of from about 75° to about 200° C.

12. The method of claim 1 further characterized in that said zeolite is subjected to said aqueous ammoniacal treatment in intimate admixture with said refractory inorganic oxide and said metal salt.

* * * * *